US008887846B2

(12) United States Patent
Yoo

(10) Patent No.: US 8,887,846 B2
(45) Date of Patent: Nov. 18, 2014

(54) ACTIVE AIR FLAP APPARATUS FOR VEHICLE

(71) Applicant: Hyundai Motor Company, Seoul (KR)

(72) Inventor: Gil Sang Yoo, Incheon (KR)

(73) Assignee: Hyundai Motor Company, Seoul (KR)

( * ) Notice: Subject to any disclaimer, the term of this patent is extended or adjusted under 35 U.S.C. 154(b) by 69 days.

(21) Appl. No.: 13/714,935

(22) Filed: Dec. 14, 2012

(65) Prior Publication Data

US 2014/0117709 A1 May 1, 2014

(30) Foreign Application Priority Data

Oct. 31, 2012 (KR) ......................... 10-2012-0122374

(51) Int. Cl.
*B60K 11/08* (2006.01)
(52) U.S. Cl.
CPC ..................................... *B60K 11/085* (2013.01)
USPC .......................................................... 180/68.1
(58) Field of Classification Search
CPC ...... B60K 11/04; B60K 11/08; B60K 11/085; B62D 25/085
USPC ...................... 180/68.1, 68.2, 68.3, 232, 274; 296/193.09, 193.1
See application file for complete search history.

(56) References Cited

U.S. PATENT DOCUMENTS

| | | | | | |
|---|---|---|---|---|---|
| 6,145,251 | A | * | 11/2000 | Ricci | 49/82.1 |
| 7,152,915 | B2 | * | 12/2006 | Diehl et al. | 296/193.1 |
| 7,498,926 | B2 | * | 3/2009 | Browne et al. | 340/425.5 |
| 7,866,737 | B2 | * | 1/2011 | Browne et al. | 296/193.1 |
| 7,887,125 | B2 | * | 2/2011 | Tazaki et al. | 296/193.1 |
| 8,056,946 | B2 | * | 11/2011 | Bernt et al. | 293/102 |
| 8,118,351 | B2 | * | 2/2012 | Gonin et al. | 296/193.09 |
| 8,128,153 | B2 | * | 3/2012 | Bernt et al. | 296/187.04 |
| 8,161,919 | B2 | * | 4/2012 | Klotz et al. | 123/41.04 |
| 8,181,727 | B2 | * | 5/2012 | Ritz et al. | 180/68.1 |
| 8,347,830 | B2 | * | 1/2013 | Tregnago et al. | 123/41.05 |
| 8,561,739 | B2 | * | 10/2013 | Hori | 180/68.1 |
| 8,607,744 | B2 | * | 12/2013 | Alexander et al. | 123/41.05 |
| 8,646,552 | B2 | * | 2/2014 | Evans et al. | 180/68.1 |
| 8,662,570 | B2 | * | 3/2014 | Guenther et al. | 296/193.1 |
| 2005/0006928 | A1 | * | 1/2005 | Diehl et al. | 296/193.1 |
| 2006/0152022 | A1 | * | 7/2006 | Rech-Linker et al. | 293/115 |
| 2008/0157566 | A1 | * | 7/2008 | Tazaki et al. | 296/193.1 |
| 2010/0071977 | A1 | * | 3/2010 | Ritz et al. | 180/68.1 |
| 2010/0282438 | A1 | * | 11/2010 | Wirth et al. | 165/67 |
| 2011/0001325 | A1 | * | 1/2011 | Bernt et al. | 293/155 |
| 2011/0181062 | A1 | * | 7/2011 | Bernt et al. | 293/102 |
| 2011/0203861 | A1 | * | 8/2011 | Charnesky et al. | 180/68.1 |
| 2011/0232981 | A1 | * | 9/2011 | Hori et al. | 180/68.1 |
| 2011/0247779 | A1 | * | 10/2011 | Charnesky et al. | 165/41 |
| 2012/0012410 | A1 | * | 1/2012 | Hori | 180/68.1 |
| 2012/0019025 | A1 | * | 1/2012 | Evans et al. | 296/193.1 |
| 2013/0081785 | A1 | * | 4/2013 | Yoo | 165/96 |

(Continued)

FOREIGN PATENT DOCUMENTS

KR    10 2011 0080037 A    7/2011

*Primary Examiner* — Hau Phan
*Assistant Examiner* — Jacob Meyer
(74) *Attorney, Agent, or Firm* — Morgan, Lewis & Bockius LLP

(57) ABSTRACT

An active air flap for a vehicle can absorb shock energy by a wing of a housing which pivots in a collision with a pedestrian and can minimize the pedestrian injury as possible.

7 Claims, 5 Drawing Sheets

(56) References Cited

U.S. PATENT DOCUMENTS

| | | |
|---|---|---|
| 2013/0103265 A1* | 4/2013 | Remy et al. .................... 701/49 |
| 2013/0146375 A1* | 6/2013 | Lee ............................. 180/68.1 |
| 2013/0184943 A1* | 7/2013 | Sato et al. ..................... 701/49 |
| 2013/0247862 A1* | 9/2013 | Sakai ......................... 123/188.1 |
| 2013/0275009 A1* | 10/2013 | Sakai ............................. 701/49 |

* cited by examiner

ACTIVE AIR FLAP APPARATUS FOR VEHICLE

CROSS-REFERENCE TO RELATED APPLICATION

The present application claims priority of Korean Patent Application Number 10-2012-0122374 filed Oct. 31, 2012, the entire contents of which application is incorporated herein for all purposes by this reference.

BACKGROUND OF INVENTION

1. Field of Invention

The present invention relates to an active air flap apparatus for a vehicle, and more particularly an active air flap apparatus for a vehicle which has a pedestrian protection function.

2. Description of Related Art

In general, not only the parts for driving such as an engine, but various heat exchangers such as a radiator, an intercooler, an evaporator, and a condenser are disposed in the engine compartment of vehicles.

These heat exchangers allow a refrigerant to flow through them and are cooled or discharge heat by means of heat exchange between the refrigerant in the heat exchangers and air outside the heat exchangers, and the external air should be supplied well in order so that various heat exchangers in the engine compartment of a vehicle can stably operate.

However, there is a problem that as a large amount of external air flows inside when a vehicle travels at a high speed, the air resistance is considerably large and fuel efficiency of the vehicle reduces.

For solving the problem, an active air flap has been developed, which increases the amount of air flowing into the engine compartment by increasing the open angle in low-speed traveling and decreases the amount of air flowing into the engine compartment by decreasing the open angle in high-speed traveling, thereby improving the fuel efficiency.

An active air flap apparatus for a vehicle, as shown in FIGS. 1 to 3, includes a duct 2 coupled to a front end module 1 of a vehicle and guiding air flow, a housing 3 coupled to the duct 2, an actuator 4 fixed to the center of the housing 3, an air flap 6 rotatable with respect to the housing 3 and opening/closing an air path 5 of the housing 3.

In this configuration, the actuator 4 includes a motor and a plurality of gear members (reduction gears), a rotary shaft 7 that can rotate about the housing is disposed at both sides of the actuator 4, the gear members are fitted on the rotary shaft such that they can transmit power, and the air flap 6 integrally combined with each of the rotary shafts 7, so that as the actuator 4 operates, the rotary shafts 7 rotate and the air flaps 6 rotate, thereby simultaneously opening/closing the air path 5 of the housing 3.

However, there is a defect that the housing 3, which is a rigid body maintaining the external appearance and having rigidity, is fixed not to move with respect to the duct in the active air flap device of the related art described above, so that a pedestrian is more injured in a collision with the pedestrian.

The information disclosed in this section is only for enhancement of understanding of the general background of invention and should not be taken as an acknowledgement or any form of suggestion that this information forms prior art.

SUMMARY OF INVENTION

The present invention has been made in an effort to remove the defects. Various aspects of the present invention provide for an active air flap apparatus for a vehicle which can minimize pedestrian injuries in a pedestrian/car accident and can satisfy the safety rules for protecting a pedestrian and improve a commercial value, by being structured such that a portion of a housing can rotate and slide with respect to a duct, when an external force is applied.

An active air flap apparatus for a vehicle according to various aspects of the present invention includes: a duct fixed to a front end module; and a housing that is coupled to the duct and where an air flap is rotatably coupled, in which the housing includes: a body fixed to the duct and where the air flap is rotatably coupled; and a pair of wings coupled to both sides of the body, respectively, to be pivotable forward/backward The apparatus may further include a rotary module connected to the body and the wing to allow the wing to pivot.

The apparatus may further include a sliding module connecting the wing with the duct to allow the wing to slide with respect to the duct, when the wing pivots.

The rotary module may include a rotary pipe vertically fixed to the wing and a fixed shaft with both ends fixed to the body vertically through the rotary pipe.

The rotary module further includes a return spring that is wound around the rotary pipe, has one end fixed to the body and the other end fixed to the wing, and provides an elastic return force to the pivot of the wing.

The sliding module includes: a guide rail bracket fixed to the duct and having a guide groove extending forward/backward; and a slider coupled to the wing and having an integral protrusion fitted in the groove and moving along the guide groove.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
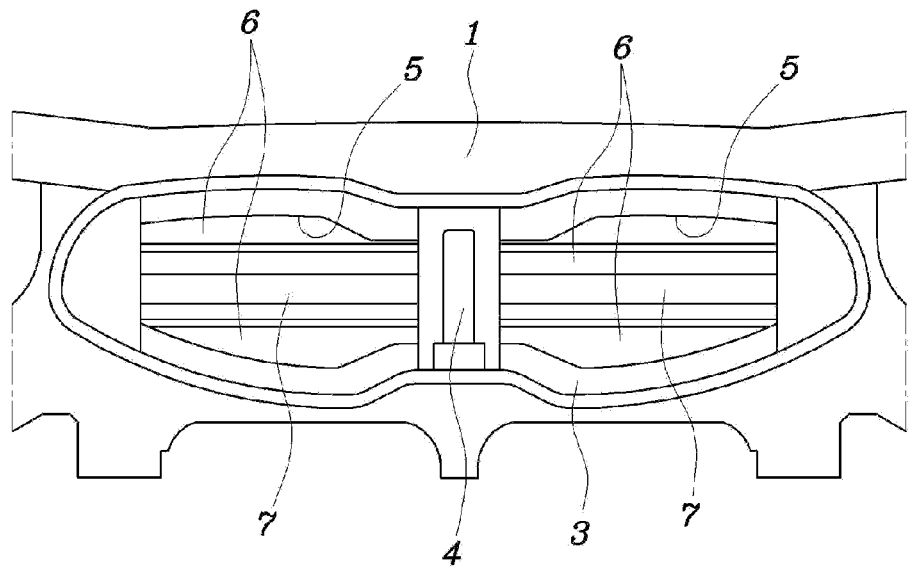
FIG. 1 is a front view of an active air flap apparatus of the related art.
Figure 2:
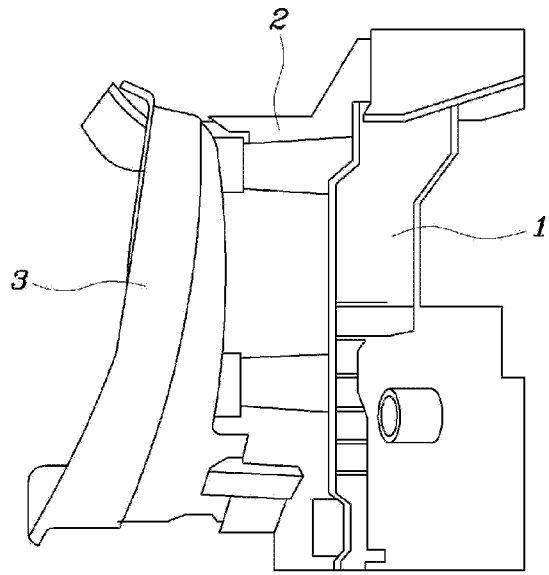
FIG. 2 is a side view of FIG. 1.
Figure 3:
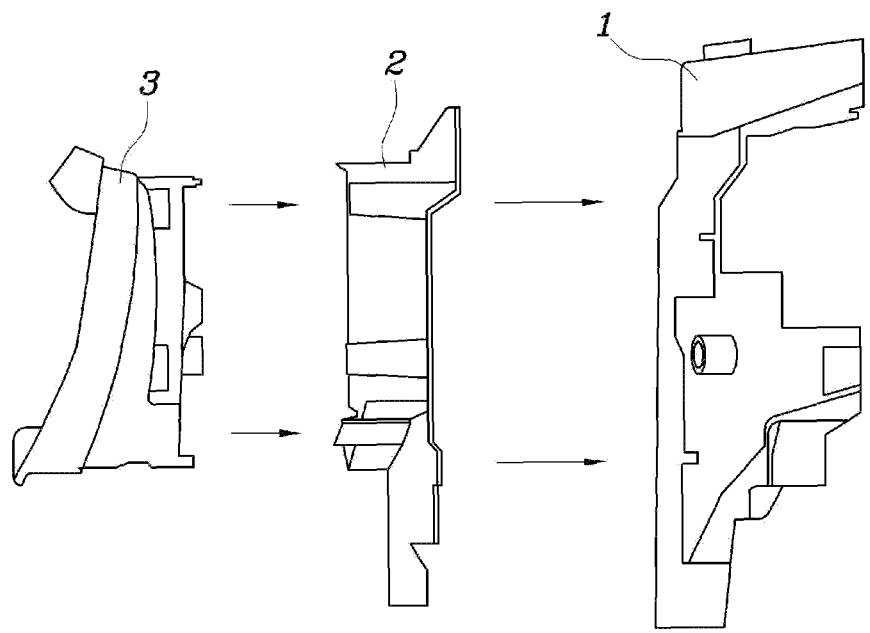
FIG. 3 is an exploded view of FIG. 2.
Figure 4:
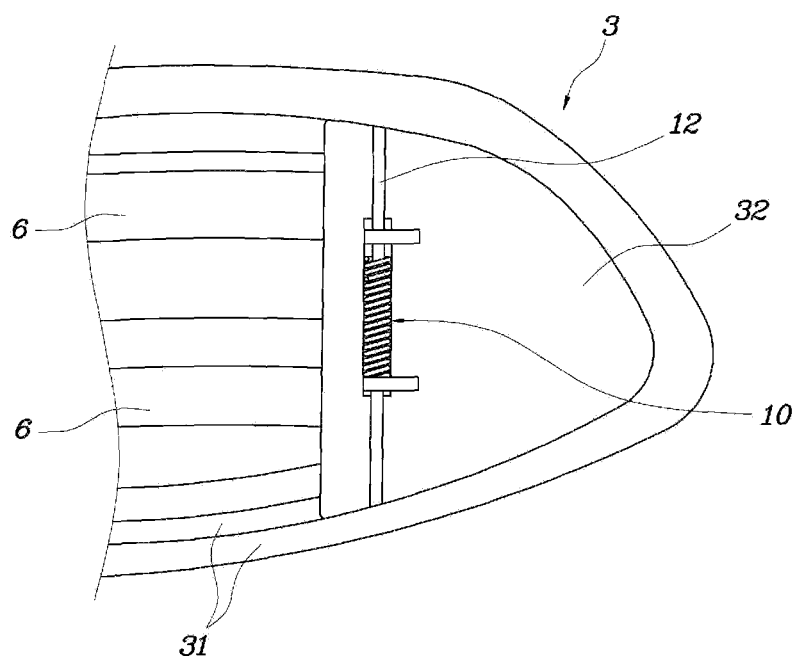
FIG. 4 is a view illustrating a housing of an active air flap apparatus according to the present invention.
Figure 5:
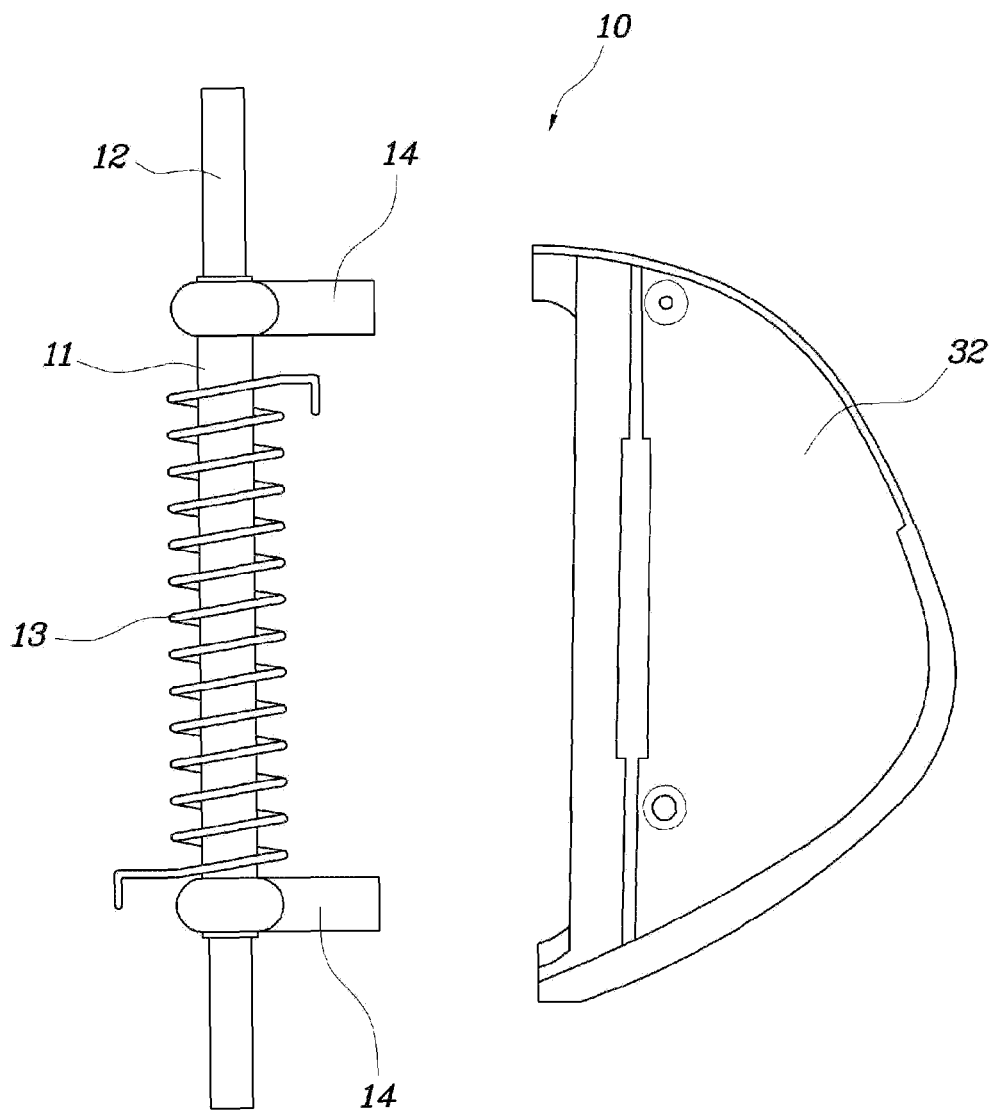
FIG. 5 is an exploded view of an exemplary rotary module according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

An active air flap apparatus for a vehicle according to various embodiments of the present invention is described hereafter in detail with reference to the accompanying drawings.

An active air flap apparatus for a vehicle, as shown in FIGS. 4 to 7, includes a duct 2 that guides air flow and a housing 3 combined with the duct 2.

The duct 2 is coupled to a front end module 1 of a vehicle shown in FIG. 1 and an actuator 4 is fixed at the center of the housing 3.

A rotary shaft 7 that can rotate with respect to the housing 3 is disposed at both sides of the actuator 4 and is rotated by power from the actuator 4, and an air flap 6 is integrally combined with each of the rotary shaft 7 and an air path 5 of the housing 3 is opened/closed by rotation of the air flap 6. One will appreciate that the rotary shaft and the air flaps may be monolithically formed.

On the other hand, the structure of the housing in the active air flap apparatus according to the present invention was improved to be able to protect a pedestrian as safe as possible, that is, the housing 3 of the active air flap apparatus according to the present invention includes a body 31 that s fixed to the duct 2 and where the air flaps 6 are rotatably coupled, and a pair of wings 32 coupled to both sides of the body 31 to be pivotable forward/backward.

Further, the active air flap apparatus according to the present invention further includes a rotary module 10 that is connected to the housing 31 and the wings 32 to allow the wings 32 to pivot, and a sliding module 20 that connects the wings 32 with the duct 2 to allow the wings 32 to slide with respect to the duct 2, when the wings 32 pivot.

In this configuration, the rotary module 10 includes a rotary pipe vertically fixed to the wing 32, a fixed shaft 12 with both ends fixed to the body 31 vertically through the rotary pipe 11, and a return spring 13 that is wound around the rotary pipe 11, has one end fixed to the body 31 and the other end fixed to the wing 32, and provides an elastic return force to the pivot of the wing 32. Pipe brackets 14 are integrally formed at the upper and lower portions of the rotary pipe 11, respectively, and the ends of the pipe brackets 14 are coupled to the wing 32 by fasteners such as bolts. One will appreciate that the pipe brackets and the rotary pipe may be monolithically formed.

Further, the rotary pipe 11 is structured to be able to freely rotate about the fixed shaft 12 and the return spring 13 is a coil spring, but not limited thereto.

The sliding module 20 includes a guide rail bracket 21 fixed to the duct 2 and having a guide groove 21a extending forward/backward, and a slider 22 coupled to the wing 32 and having an integral protrusion 22a fitted in the groove 21a and moving along the guide groove 21a. One will appreciate that the protrusion may be monolithically formed with the slider.

A plurality of guide rail brackets 21 are provided and a plurality of guide protrusions are formed on the slider 22.

The operation of various embodiments of the present invention is provided hereafter.

Figure 6:
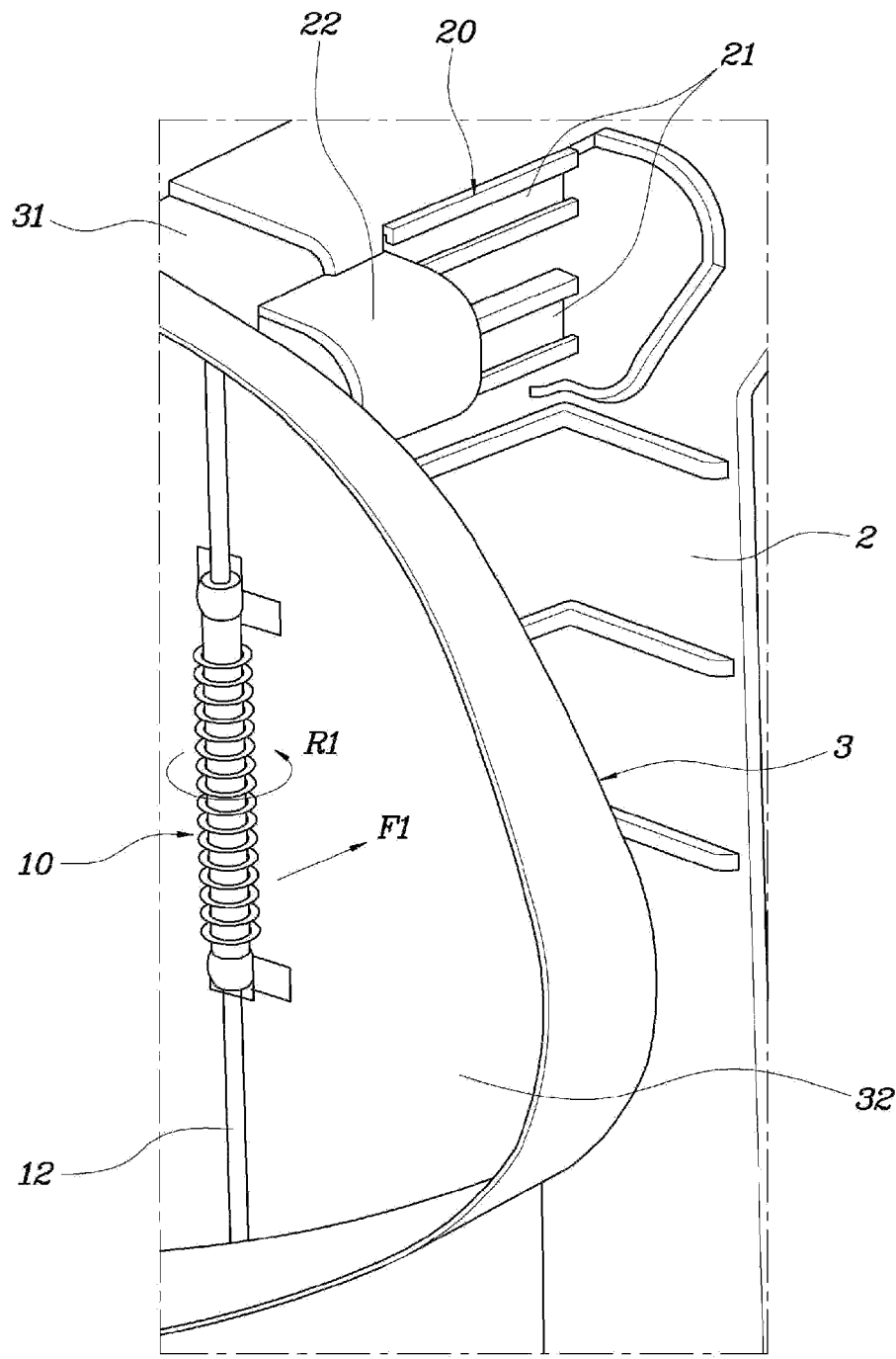
FIGS. 6 and 7 are views illustrating an exemplary sliding module according to the present invention.

When a shock is applied to the housing due to contact with a pedestrian and an external force indicated by the arrow F1 in FIG. 6 is applied to the wing 32 of the housing 3, the wing 32 pivots backward about the fixed shaft 12, as indicated by an arrow R1 in the figure.

Figure 7:
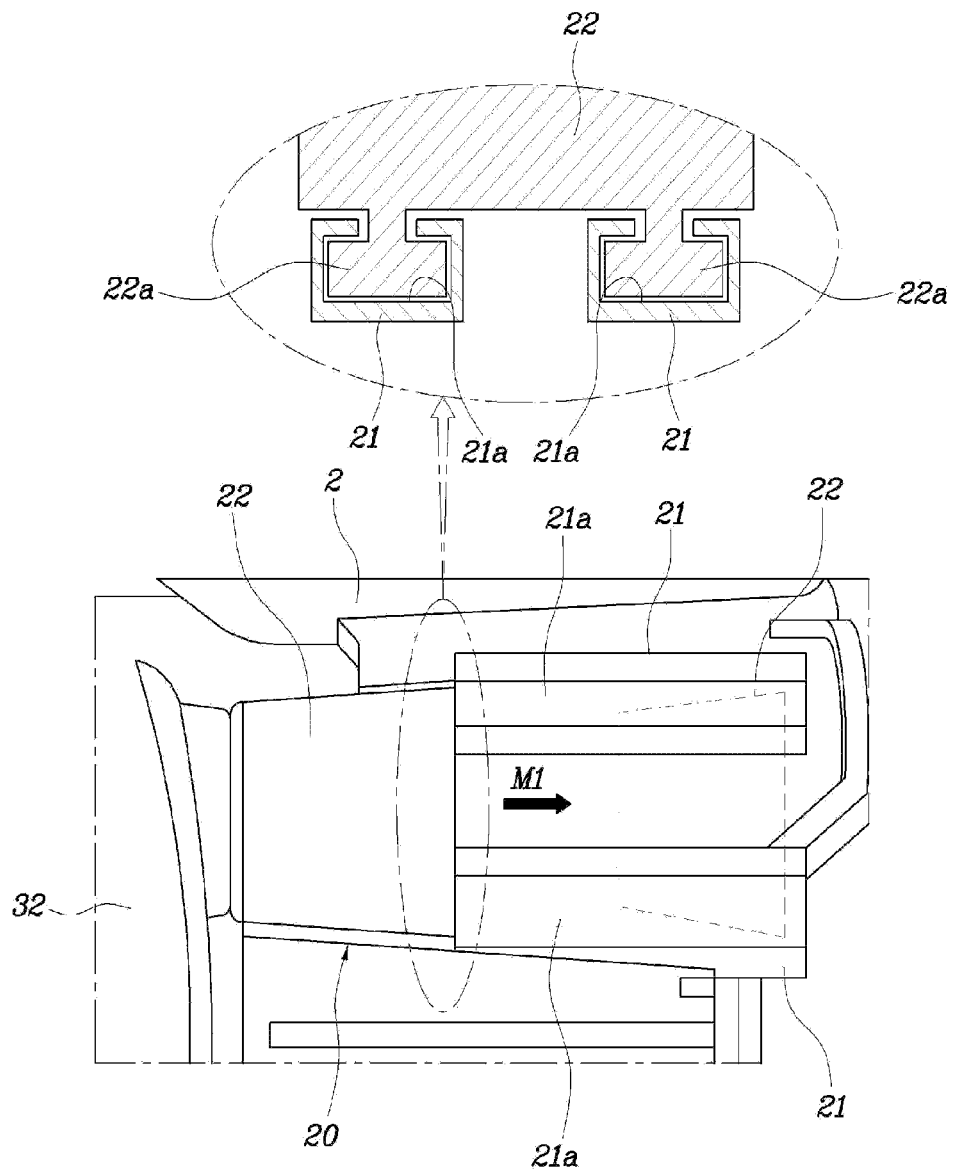

As the wing 32 pivots, the return spring 13 is compressed, and simultaneously, the slider 22 moves back along the guide rail bracket 21, as indicated by an arrow M1 in FIG. 7.

The slider 22 is moved by the protrusions 22a of the slider 22 which move-along the guide groove 22a formed on the guide rail bracket 21.

As described above, the shock energy can be absorbed by the pivot of the wing 32 in a collision with a pedestrian, so that it is possible to injure the pedestrian as less as possible and satisfy safety rules for protecting a pedestrian, and accordingly, it is possible to considerably improve a commercial value.

Further, the wing 32 pivoted backward is returned by a return force of the return spring 13, when the external force is removed, and the slider 22 also returns forward into the status shown in FIG. 6.

According to an active air flap apparatus for a vehicle of the present invention, since the wing of the housing can absorb shock energy by pivoting in a collision with a pedestrian, so that it is possible to minimize the pedestrian injury as possible, and moreover, since it is possible to satisfy safety rules for protecting a pedestrian, so that it is possible to considerably improve a commercial value.

For convenience in explanation and accurate definition in the appended claims, the terms upper or lower, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An active air flap apparatus for a vehicle, comprising:
   a duct fixed to a front end module; and
   a housing coupled to the duct, wherein the housing further includes:
      a body fixed to the duct, wherein an air flap is rotatably coupled to the body; and
      a pair of wings coupled to both sides of the body, respectively, to be pivotable forward/backward with respect to the body;
      wherein the wings and the air flap are decoupled to each other.

2. The apparatus of claim 1, further comprising a rotary module connected to the body and the wings to allow the wings to pivot.

3. The apparatus of claim 1, further comprising a sliding module connecting the wings with the duct to allow the wings to slide with respect to the duct, when the wings pivot.

4. The device of claim 2, wherein the rotary module comprises:
   a rotary pipe vertically fixed to the wing; and
   a fixed shaft with both ends fixed to the body by extending vertically through the rotary pipe.

5. The apparatus of claim 4, wherein the rotary module further comprises a return spring wound around the rotary pipe, has one end fixed to the body and the other end fixed to the wings, and provides an elastic return force to the pivot of the wings.

6. The apparatus of claim 3, wherein the sliding module comprises:
   a guide rail bracket fixed to the duct and having a guide groove extending forward/backward; and
   a slider coupled to the wings and having an integral protrusion fitted in the groove and moving along the guide groove.

7. The apparatus of claim 1, wherein rotational axes of the wings and the air flap are not coaxial.

* * * * *